United States Patent [19]

Tsukamoto et al.

[11] Patent Number: 5,724,541
[45] Date of Patent: Mar. 3, 1998

[54] APPARATUS AND METHOD FOR RANDOMLY ACCESSING SEQUENTIAL ACCESS STORAGE

[75] Inventors: Junichi Tsukamoto, Tokyo; Koichi Goto; Shinichi Fukushima, both of Kanagawa, all of Japan

[73] Assignee: Sony Corporation, Tokyo, Japan

[21] Appl. No.: 501,828

[22] Filed: Jul. 13, 1995

[30] Foreign Application Priority Data

Jul. 20, 1994 [JP] Japan .................................. 6-189895

[51] Int. Cl.[6] ............................................ G06F 12/00
[52] U.S. Cl. ......................... 395/438; 395/417; 395/487; 395/404
[58] Field of Search .................... 395/404, 406, 395/438, 439, 440, 441, 488, 489, 492, 415, 416, 417, 487, 413, 414, 418, 419; 345/185

[56] References Cited

U.S. PATENT DOCUMENTS

| | | | |
|---|---|---|---|
| 4,531,163 | 7/1985 | Maerkl et al. | 360/49 |
| 5,155,835 | 10/1992 | Belsan | 395/441 |
| 5,210,866 | 5/1993 | Milligan et al. | 395/182.04 |
| 5,297,124 | 3/1994 | Plotkin et al. | 369/32 |
| 5,363,487 | 11/1994 | Willman et al. | 395/828 |
| 5,371,885 | 12/1994 | Letwin | 395/621 |
| 5,388,108 | 2/1995 | DeMoss et al. | 395/182.04 |
| 5,394,534 | 2/1995 | Kulakowski et al. | 395/439 |
| 5,403,639 | 4/1995 | Belsan et al. | 395/600 |
| 5,455,926 | 10/1995 | Keele et al. | 395/404 |
| 5,515,502 | 5/1996 | Wood | 395/182.13 |

OTHER PUBLICATIONS

Ray Duncan, An examination of the DevHlp API. Microsoft Systems Journal. v3, N2, p.39(17), Mar. 1988.

*Primary Examiner*—Matthew M. Kim
*Attorney, Agent, or Firm*—William S. Frommer; Alvin Sinderbrand

[57] ABSTRACT

An information storage device randomly accesses data items in a sequential access storage medium. A controller, upon loading of the sequential access storage medium, causes the blocks of data items in the sequential access storage medium to be copied to corresponding blocks on the random access storage medium whose correspondence is established by the table. A table establishes the correspondence between blocks of data items in the random access storage medium and blocks of data items in the sequential access storage medium. Upon receiving an instruction from a host computer, the controller further performs a series of read/write operations on the blocks of data items in the random access storage medium. The overwritten blocks of data items on the random access storage medium are updated to the corresponding blocks on the sequential access storage medium.

16 Claims, 7 Drawing Sheets

Fig. 3

| BLOCK NUMBER ON HARD DISK | BLOCK NUMBER ON TAPE | REWRITE FLAG | START AND END OF PHYSICAL SECTOR NUMBER | START AND END OF VIRTUAL SECTOR NUMBER | 1ST TRACK ID ON TAPE |
|---|---|---|---|---|---|
| 0 | 56 | 1 | 0 / 4095 | 229376 / 233471 | 67200 / 68399 |
| 1 | 3 | 0 | 4096 / 8191 | 12288 / 16383 | 3600 / 4799 |
| 2 | 1 | 0 | 8192 / 12287 | 4096 / 8191 | 1200 / 2399 |
| 3 | 19 | 0 | 12288 / 16383 | 77824 / 81919 | 22800 / 23999 |
| 4 | 28 | 0 | 16384 / 20479 | 114688 / 118783 | 33600 / 34799 |
| 5 | 54 | 1 | 20480 / 24575 | 221184 / 225279 | 64800 / 65999 |
| 6 | 30 | 0 | 24576 / 28671 | 122880 / 126975 | 36000 / 37199 |
| 7 | 29 | 1 | 28672 / 32767 | 118784 / 122879 | 34800 / 35999 |
| 8 | 22 | 0 | 32768 / 36863 | 90112 / 94207 | 26400 / 27599 |
| 9 | 38 | 1 | 36864 / 40959 | 115648 / 159743 | 45600 / 46799 |
| 10 | 47 | 0 | 40960 / 45055 | 192512 / 196607 | 56400 / 57599 |
| 11 | 44 | 0 | 45056 / 49151 | 180224 / 184319 | 52800 / 53999 |
| 12 | 45 | 0 | 49152 / 53247 | 184320 / 188415 | 54000 / 55199 |
| 13 | 27 | 0 | 53248 / 57343 | 110592 / 114687 | 32400 / 33599 |
| 14 | 4 | 0 | 57344 / 61439 | 16384 / 20479 | 4800 / 5999 |
| 15 | 8 | 1 | 61439 / 65535 | 32768 / 36863 | 9600 / 10799 |

| THE NUMBER OF SECTORS PAR 1 BLOCK ON HARD DISK | THE NUMBER OF TRACKS PAER 1 BLOCK ON TAPE |
|---|---|
| 4096 | 1200 |

←— MANAGED PORTION —→ ←— PORTION WHICH CAN BE LED OUT EQUIVALENTLY —→

APPARATUS AND METHOD FOR RANDOMLY ACCESSING SEQUENTIAL ACCESS STORAGE

BACKGROUND OF THE INVENTION

The present invention relates to an information storage device and, in particular, to an information storage device that includes a magnetic tape recording medium used in connection with a random access recording medium, such as a hard disk drive.

In a previously proposed digital VTR system, a digitized video signal is compressed in accordance with a DCT (Discrete Cosine Transform) technique. This compressed digital video signal is recorded in oblique tracks of a magnetic tape. Each track is provided with a subcode area for storing a track number. The VTR system manages the recorded data in accordance with these track numbers. Furthermore, the capacity of such a magnetic medium to record digital data permits such a medium to record information signals in addition to the digital video signals.

Although such a magnetic tape provides a large storage capacity, when compared with other recording media, accessing the information recorded thereon is slow because a magnetic tape is essentially a sequential access medium. That is, in order to read data recorded at a predetermined position of the tape, the reading device must physically wind or unwind the tape to this predetermined position.

OBJECTS AND SUMMARY OF THE INVENTION

Therefore, it is an object of the present invention to provide an information storage device in which information on a sequential access recording medium can be randomly accessed.

In accordance with this invention, an information storage device includes a sequential access store and a random access store. Information recorded in the sequential access store is loaded into the random access store. When an external device extracts selected data from the information storage device, it first transmits to the storage device a first data location marker, which is indicative of the physical location on the sequential access store that includes the selected data. On the basis of this first data location marker, the information storage device finds a previously stored second data location marker which is indicative of the location on the random access store in which is recorded the same selected data. This selected data is then read out from the random access store of the information storage medium. Thus, the present invention provides a recording medium with a large storage capacity, such as a magnetic tape, that is used in conjunction with a random access storage medium, such as a hard disk drive, resulting in effectively accessing on a random access basis, data stored on the sequential access storage medium (i.e., the magnetic tape).

Various other objects, advantages and features of the present invention will become readily apparent from the ensuing detailed description, and the novel features will be particularly pointed out in the appended claims.

BRIEF DESCRIPTION OF THE DRAWINGS

The following detailed description, given by way of example and not intended to limit the present invention solely thereto, will best be understood in conjunction with the accompanying drawings in which:

FIG. 3 is an exemplary illustration of the contents of the sector table memory of the information storage device;

DETAILED DESCRIPTION OF THE INVENTION

Figure 1:
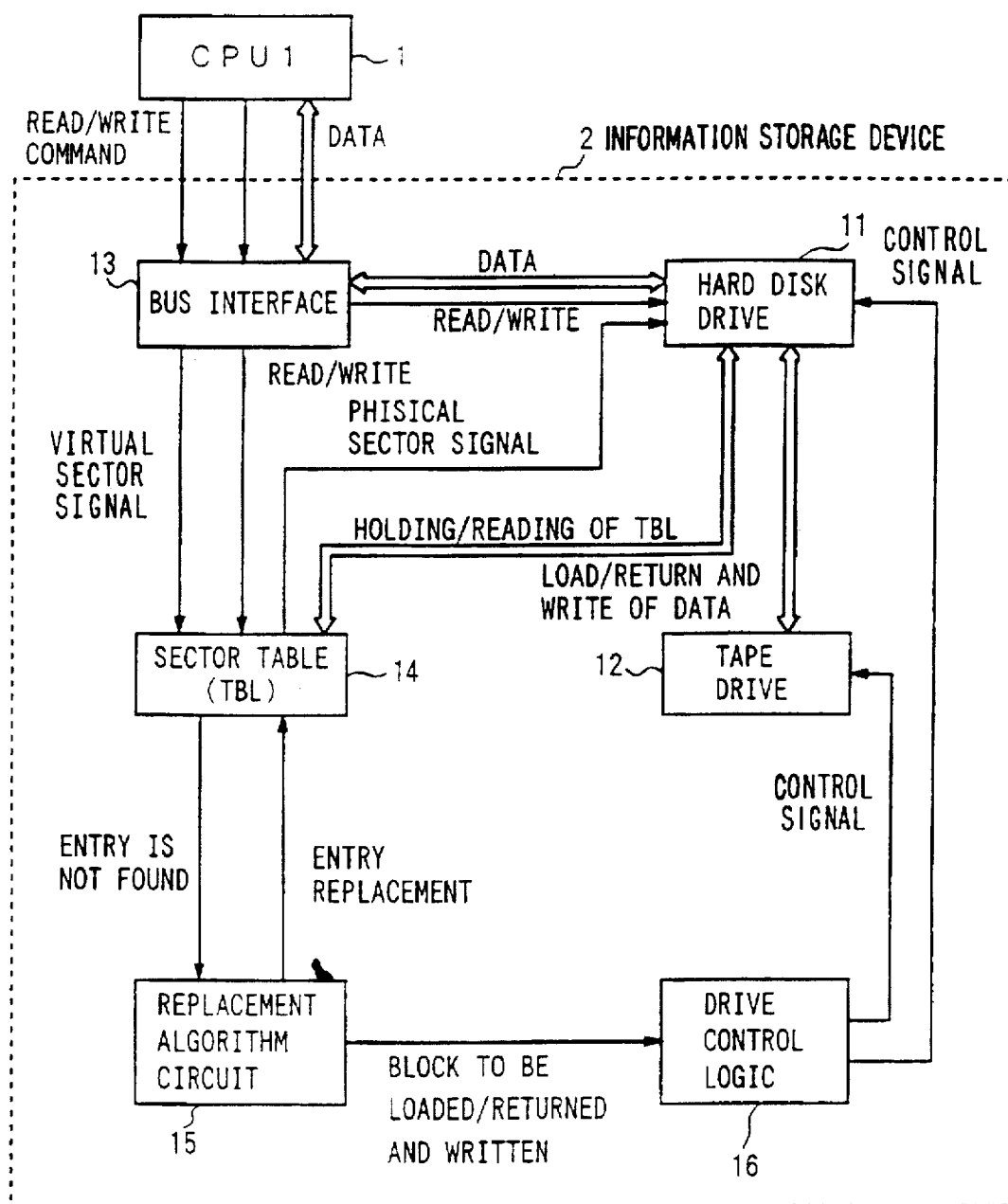
FIG. 1 illustrates the information storage device of the present invention.

FIG. 1 illustrates an information storage device 2 in accordance with the present invention. A hard disk drive 11 is used for recording data on one or more magnetic disks (not shown) of relatively large capacity. This recorded data is accessed randomly from the magnetic disk. A tape drive 12 is capable of driving, for example, a tape cassette of a digital VTR. A different track number is assigned to and recorded in a subcode area of each track. As explained before, data recorded on this tape is adapted to be managed in accordance with these track numbers. For simplicity, data that is recorded on the digital VTR cassette shall be regarded as recorded in tape drive 12.

Figures 2A, 2B:
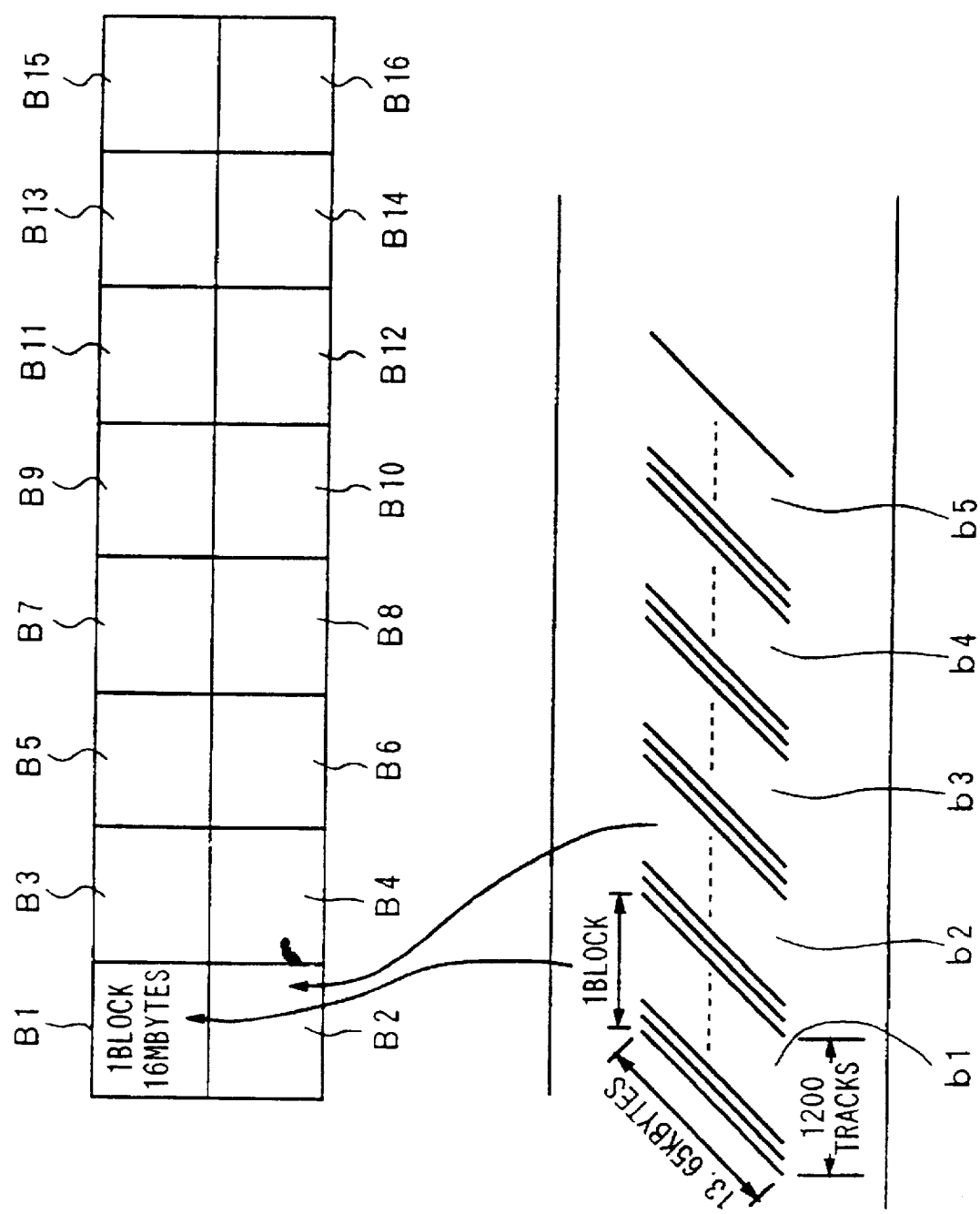
FIG. 2A illustrates the arrangement of data blocks in the hard disk drive of the information storage device.
FIG. 2B illustrates the arrangement of data blocks in the sequential magnetic medium of the information storage device.

Before proceeding to the remaining elements of FIG. 1, the discussion shall momentarily turn to FIGS. 2A and 2B, which describe the organization of data in hard disk drive 11 and tape drive 12. FIG. 2B illustrates a magnetic tape comprising a plurality of oblique tracks. Each track has a storage capacity of, for example, 13.65 Kbytes, and each one of blocks b1, b2, b3, etc., comprises 1,200 of such consecutive tracks. FIG. 2A illustrates the arrangement of data recorded on hard disk drive 11. Each block B1, B2, B3, etc., recorded in hard disk drive 11, is arranged to have a one-to-one correspondence with blocks b1, b2, b3, etc., of tape drive 12. The storage capacity of each block in hard disk drive 11 is the same as the storage capacity of each block in tape drive 12, namely, 16 Mbytes. Therefore, assuming that the storage capacity of the hard disk drive is 256 Mbytes, hard disk drive 11 can store up to 16 of such blocks. Moreover, assuming that each physical sector of hard disk drive 11 comprises 4 Kbytes, then each block of hard disk drive comprises 4,096 sectors. A sector denotes the minimum unit of data that is read out or written to hard disk drive 11.

As an initial matter, before any data is read from information storage device 2, the data already recorded on tape drive 12 is first loaded to hard disk drive 11. During this initialization, a copy of each block of data, together with the tape location of each block, is written to hard disk drive 12.

Returning to FIG. 1, bus interface 13 is used to connect the bus of a CPU 1 or other host device or controller and the storage device 2. Data to be recorded or reproduced is supplied between CPU 1 and storage device 2 through bus interface 13. When accessing storage device 2, CPU 1 designates a virtual sector number which corresponds to a portion of the magnetic tape on which is recorded the desired data. CPU 1 then generates a read/write command which is supplied through bus interface 13.

A sector table (TBL) 14 is coupled to bus interface 13 and also to hard disk drive 11 and comprises a table indicative of a corresponding relation between the virtual sector number on the magnetic tape and the physical sector number on the hard disk drive. The sector table 14 determines which data from tape drive 12 has been loaded to hard disk drive 11, and it also determines whether a match exists between data on the hard disk drive 11 and data on the tape drive 12.

A replacement algorithm circuit 15 is coupled to sector table 14 and is adapted to judge which portion of the data stored in the tape drive 12 should be loaded to the hard disk drive 11, and it also determines which data of the hard disk drive is to be deleted in order to make room for data that has been selected to be reproduced from the tape drive.

Drive control logic 16 is coupled to replacement algorithm circuit 15 and instructs the hard disk 11 and tape drive 12 to exchange data between them when it is necessary to replace a block stored on the hard disk drive 11.

The virtual sector number supplied to bus interface 13 by CPU 1 is, in turn, supplied to the sector table 14. The sector table checks whether the block corresponding to the supplied virtual sector number has already been loaded from the tape drive onto the hard disk drive. In order to access the selected data, the sector table 14 provides a physical sector number that corresponds to the virtual sector number to indicate the location on hard disk drive 11 of the selected block number. The hard disk drive is accessed by this physical sector number and data at that sector is inputted/outputted between the CPU 1 and the hard disk drive 11 through the bus interface 13.

If the block corresponding to the supplied virtual sector number has not been loaded to hard disk drive 11, replacement algorithm circuit 15 reserves a physical sector number on the hard disk drive for this block. Sector table 14 is consequently updated to store the correspondence between the supplied virtual sector number and the newly reserved physical sector number. The tape drive then advances to the position of the block corresponding to the supplied virtual sector number and the data of this block is loaded from the tape drive onto the hard disk drive to be stored at the physical sector number of the hard disk drive corresponding to the virtual sector number. The hard disk drive 11 is accessed by this physical sector number and data at that sector is inputted/outputted between the CPU 1 and the hard disk drive through the bus interface 13.

According to the embodiment of the invention as mentioned above, data from the tape drive 12 is loaded into the hard disk drive 11 at a sector corresponding to the virtual sector number inputted from the CPU 1. By such an operation, although the hard disk drive is actually accessed, insofar as the CPU is concerned, it is seen as if the tape drive 12 was directly accessed. Consequently, a storage device of large capacity which can be accessed at random is provided by the present invention.

FIG. 3 shows an example of the sector table 14 which may be implemented as a volatile memory. As stated before, the sector table establishes a correspondence between the blocks recorded on hard disk drive 11 and tape drive 12 and between the physical sector numbers of the hard disk drive and the virtual sector numbers of the tape drive. The Rewrite flag shown in FIG. 3 is a flag indicating whether data has been rewritten from the tape drive to the hard disk drive. When the flag is set to "1", it indicates that the data has been rewritten, and when it is set to "0", it indicates that the data has not been rewritten.

Figure 4:
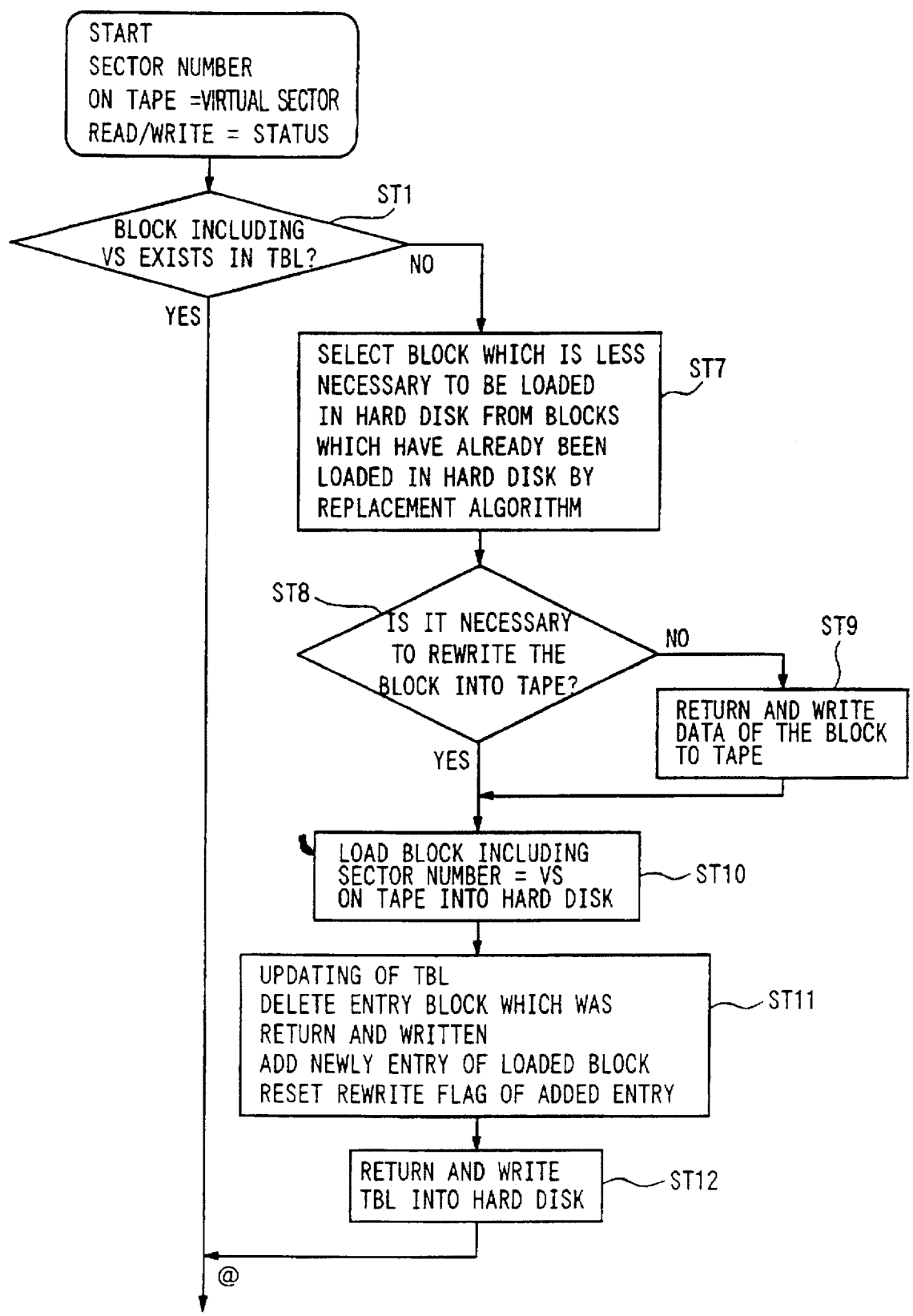
FIGS. 4 and 5 are intended to be viewed together, and they illustrate a flow diagram indicative of a data access operation of the present invention.
Figure 5:
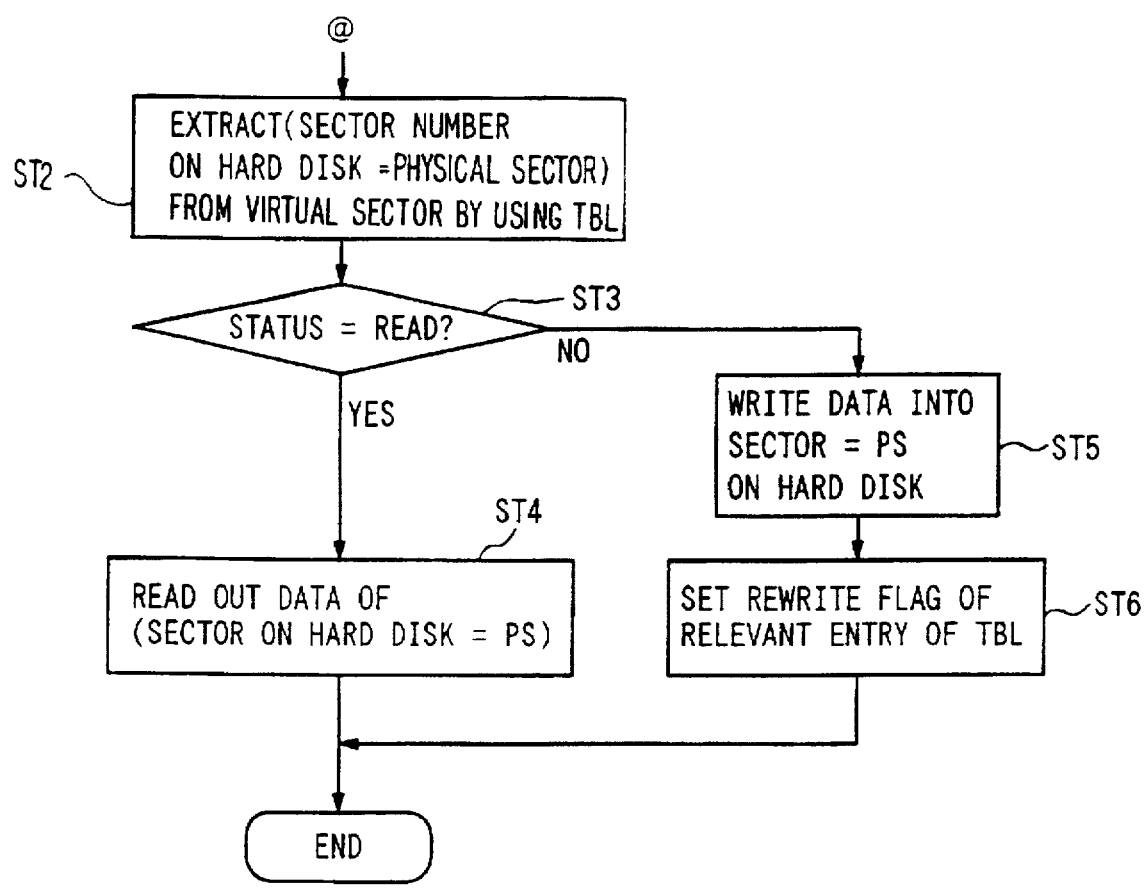

FIGS. 4 and 5 show a flow diagram representing data accesses.

A virtual sector number (vs) of the data to be accessed and information regarding whether the data is read or written are checked (step ST1). This is equivalent to an inquiry to determine whether the data to be accessed has already been loaded to the hard disk.

When the data has been loaded to the hard disk, a physical sector number (ps) corresponding to the virtual sector number (vs) is read from sector table 14 (step ST2). Inquiry is made as to whether the data is to be read or written (step ST3). Data to be read out is read from physical sectors of the hard disk drive 11 (step ST4). Data to be written is written to physical sectors of the hard disk 11 (step ST5). When the data is written, the Rewrite flag is set to "1" at an entry of the sector table 14 that corresponds to the block that includes the written data (step ST6).

If the data to be accessed has not been loaded on the hard disk 11, inquiry ST1 is answered in the negative and it is necessary to newly load a block from the tape drive to the hard disk at the sector corresponding to the virtual sector number vs. Since the number of blocks which can be loaded on the hard disk 11 is constant, when all entries in the sector table 14 are occupied, one of the blocks on the hard disk drive 11 is deleted and the new block to be accessed is loaded at the location of the deleted block.

In this case, replacement algorithm circuit 15 selects, from among the entries in sector table 14, the block that is used the least, and this block is deleted (step ST7). Inquiry is made to determine if the Rewrite flag has been set in the data block (step ST8). If the Rewrite flag for the deleted block had been set, the data of the block is returned and written to the tape (step ST9).

Subsequently, the new block is loaded to the reserved location (step ST10) and the sector table is updated (step ST11). The contents of the sector table are copied onto the hard disk (step ST12) for preparation of a power source shut-off. The processing routine then advances to step ST2 (FIG. 5).

Figure 6:
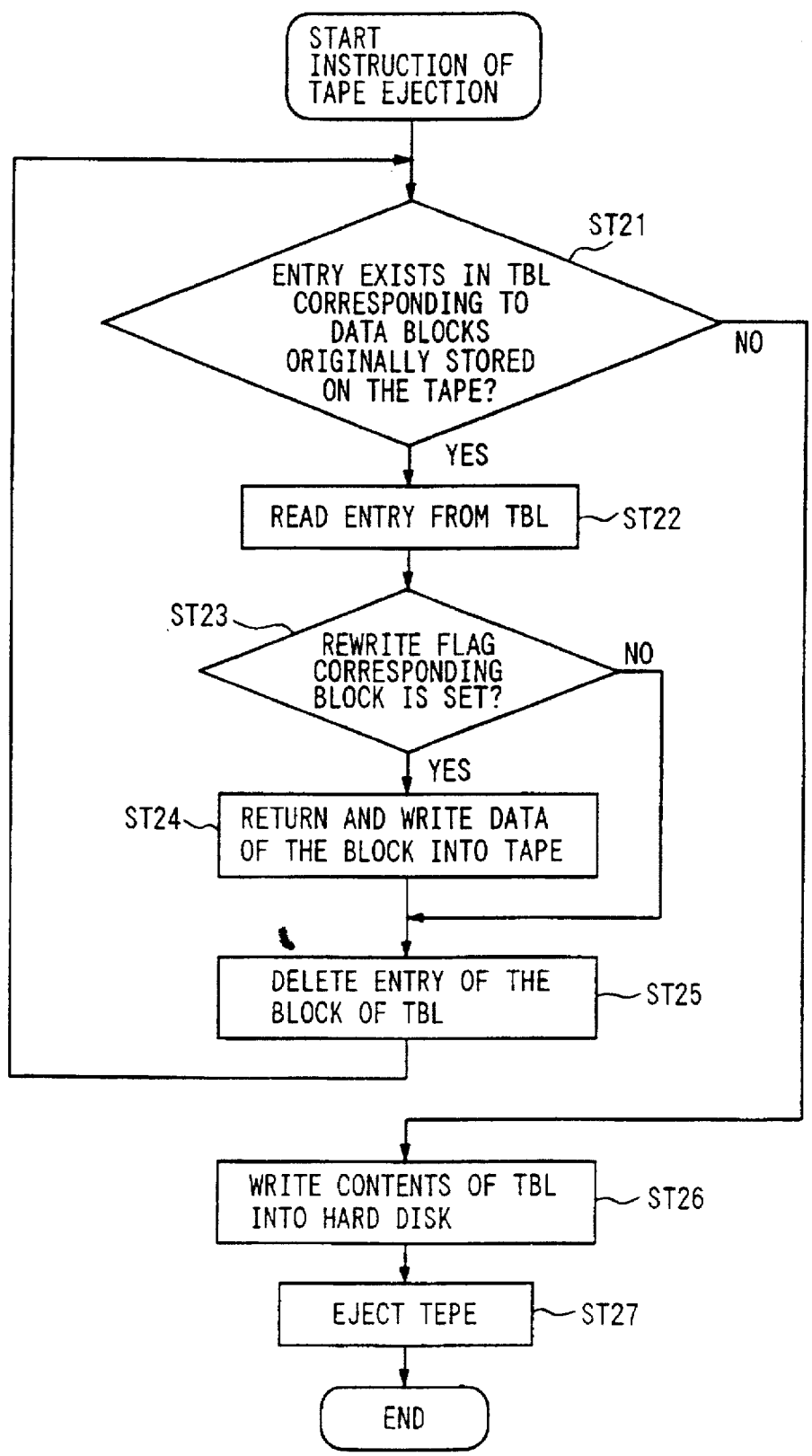
FIG. 6 illustrates a flow diagram indicative of a tape ejection process of the present invention.

FIG. 6 is a flow diagram representing the operation when the tape is ejected from the tape drive. Inquiry is made to determine whether any entries for the tape exists in the sector table (step ST21) (i.e., determine which, if any, portions of the sector table stores virtual sector numbers corresponding to data blocks originally stored on the tape). If so, such an entry is read from the table (step ST22) and then inquiry is made to determine if the Rewrite flag corresponding to that entry has been set to "1" (step ST23). If the Rewrite flag has been set to "1", the data of the block identified by this entry is returned and written onto the tape (step ST24) and the entry is deleted from the table (step ST25). When the Rewrite flag is not set to "1", step ST24 is omitted and the entry simply is deleted. As mentioned above, among the entries of the blocks in the sector table 14, all blocks in which the Rewrite flags were set to "1" are returned and written to the tape. When all of the blocks are returned and written to the tape, the contents of the table are stored on the hard disk drive (step ST26) and, after that, the tape is ejected (step ST27).

Figure 7:
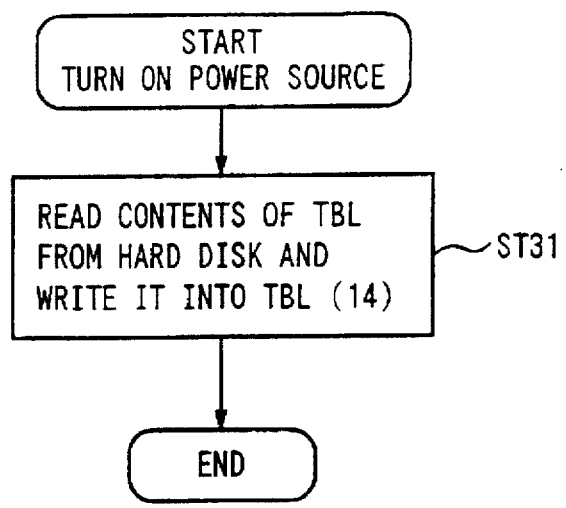
FIG. 7 illustrates a flow diagram indicative of an initialization of the information storage device of the present invention.

FIG. 7 shows a flow chart representing the operation that is carried out when the power source is turned on. When the power source is turned on, the contents of the table are read out from the hard disk drive (step ST31) to the sector table 14.

Figure 8:
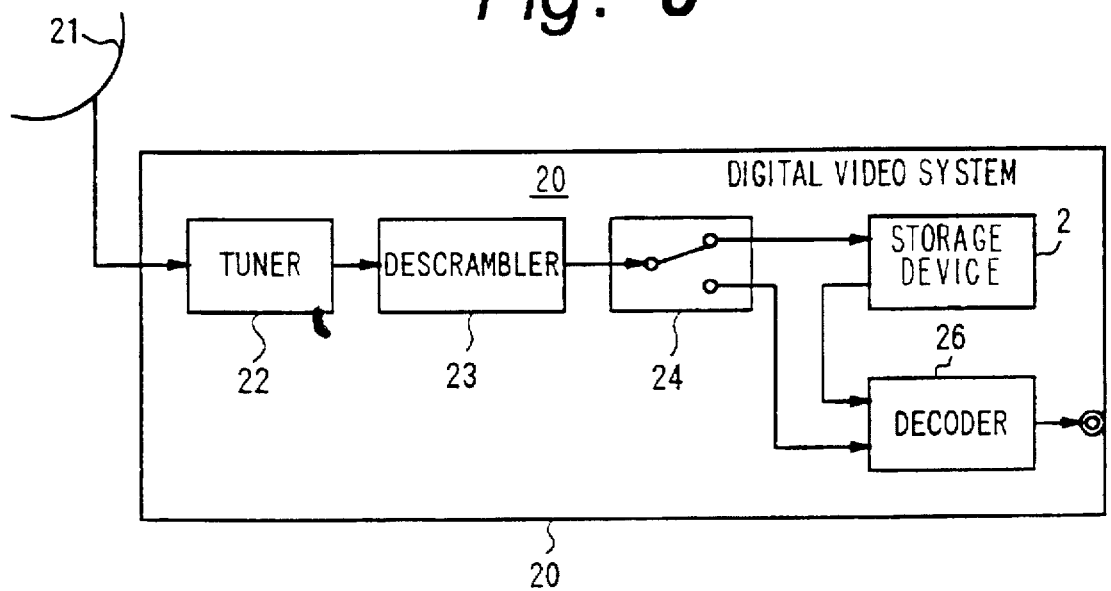
FIG. 8 illustrates a video broadcast reception system that employs the information storage device of the present invention.

FIG. 8 illustrates a digital video system 20 that includes the storage device 2 of the present invention. Satellite dish 21 (or other suitable digital data receiving apparatus) receives a digital video signal compressed in accordance with the MPEG compression technique. The desired video signal is selected by tuner 22 and descrambled by descrambler 23. When a user wishes to record the incoming video signal, switch 24 supplies the descrambled video signal to storage device 2. In order to reproduce the stored video signal for viewing, the storage device 2 supplies the video signal to decoder 26, which supplies the decoded video signal to a television monitor (not shown). When a user merely wishes to watch a currently broadcast program without recording it, switch 24 supplies the descrambled video signal directly to decoder 26.

While the present invention has been particularly shown and described with reference to the preferred embodiments, it will be readily appreciated by those of ordinary skill in the art that various changes and modifications may be made without departing from the spirit and scope of the invention. For example, any storage device, such as a magneto-optic disk drive, can be used in place of the hard disk drive 11, so long as the device can be accessed at random and has a relatively large capacity. It is intended that the appended claims be interpreted as covering the embodiments described herein and all equivalents thereto.

What is claimed is:

1. An information storage device for randomly accessing data items upon an instruction from a host processor to access said data items stored in a sequential access storage means that is loaded into access means that sequentially accesses said sequential access storage means, comprising:

random access storage means for storing said data items in randomly accessed storage locations;

read/write means for performing a series of read/write operations to read said data items from and to write said data items to said random access storage means;

table means for establishing a correspondence between blocks of data items in said random access storage means and blocks of data items in said sequential access storage means in which the same data items are stored; and control means operable, upon loading of said sequential access storage means, for causing said read/write means to copy said blocks of data items in said sequential access storage means to corresponding blocks of data items in said random access storage means whose correspondence is established by said table means, for receiving said instruction from said host computer requesting access of respective blocks of data items in said sequential access storage means and causing said read/write means to perform said series of read/write operations on corresponding blocks of data items copied from said sequential access storage means to said random access storage means, thereby randomly accessing data items stored on said sequential access storage means, for updating, after said read/write means completes said series of read/write operations, those respective blocks on said sequential access storage means whose corresponding blocks that were copied to said random access storage means have been rewritten by said read/write means.

2. The information storage device of claim 1, wherein said blocks of data items on said sequential access storage means that were copied on said random access storage means comprises a portion of the entire set of said blocks of data items stored on said sequential access storage means, and wherein said control means further deletes a block of data items on said random access storage means when the memory capacity of said random access storage means is filled.

3. The information storage device of claim 2, wherein the deleted block of data items is the least accessed block.

4. The information storage device of claim 2, wherein said control means further updates said respective blocks whose corresponding blocks have been rewritten when the sequential access storage means is ejected from the access means.

5. The information storage device of claim 2, wherein said control means further causes said read/write means to store said correspondence established by said table means to said sequential access storage medium and to retrieve said correspondence from said sequential access storage means upon loading of said sequential access storage means.

6. The information storage device of claim 1, wherein said data items includes video data items.

7. The information storage device of claim 1, wherein said sequential access storage means is a tape medium and said random access storage means is a magnetic hard disk medium.

8. The information storage device of claim 1, wherein said instruction from said host computer to access said blocks of data items on said sequential access storage means is a virtual address of said sequential access storage means and said correspondence of said table means is a physical address of said random access storage means.

9. An information storage method for randomly accessing data items upon an instruction from a host processor to access said data items stored in a sequential access storage medium that is loaded into access means that sequentially accesses said sequential access storage medium, comprising the steps of:

storing said data items in a random access storage medium;

performing a series of read/write operations to read said data items from and to write said data items to said random access storage medium;

establishing a correspondence between blocks of data items in said random access storage medium and blocks of data items in said sequential access storage medium in which the same data items are stored;

upon loading of said sequential access storage medium, copying said blocks of data items in said sequential access storage medium to corresponding blocks of data items in said random access storage medium whose correspondence is established;

receiving said instruction from said host computer requesting access of respective blocks of data items in said sequential access storage medium and performing said series of read/write operations on corresponding blocks of data items copied from said sequential access storage medium to said random access storage medium, thereby randomly accessing data items stored on said sequential access storage medium; and updating, after said series of read/write operations is complete, those respective blocks on said sequential access storage medium whose corresponding blocks that were copied to said random access storage medium have been rewritten by said read/write operations.

10. The method of claim 9, wherein said blocks of data items on said sequential access storage medium that were copied on said random access storage medium comprises a portion of the entire set of said blocks of data items stored on said sequential access storage medium, further comprising the step of deleting a block of data items on said random access storage medium when the memory capacity of said random access storage medium is filled.

11. The method of claim 10, wherein the deleted block of data items is the least accessed block.

12. The method of claim 10, further comprising the step of updating said respective blocks whose corresponding blocks have been rewritten when the sequential access storage medium is ejected from the access means.

13. The method of claim 10, further comprising the step of storing and retrieving said established correspondence to/from said sequential access storage medium upon loading of said sequential access storage medium.

14. The method of claim 9, wherein said data items includes video data items.

15. The method of claim 9, wherein said sequential access storage medium is a tape medium and said random access storage medium is a magnetic hard disk medium.

16. The method of claim 9, wherein said instruction from said host computer to access said blocks of data items on said sequential access storage medium is a virtual address of said sequential access storage medium and said correspondence is a physical address of said random access storage medium.

* * * * *